Dec. 20, 1966  G. L. TRAVERS  3,292,681
PNEUMATIC TIRES

Filed Jan. 21, 1964  2 Sheets-Sheet 1

INVENTOR.
GEORGES LOUIS TRAVERS
BY Brumbaugh, Free, Graves
& Donohue
his ATTORNEYS Dec. 20, 1966  G. L. TRAVERS  3,292,681
PNEUMATIC TIRES
Filed Jan. 21, 1964  2 Sheets-Sheet 2
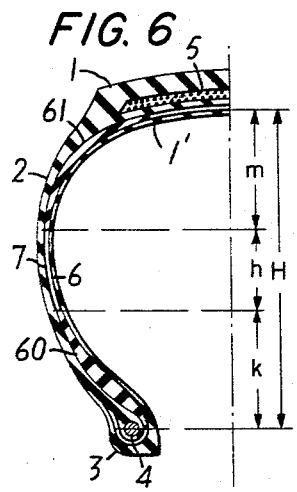
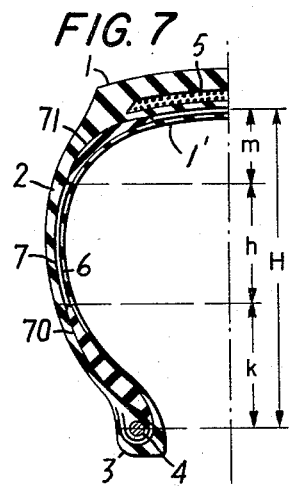
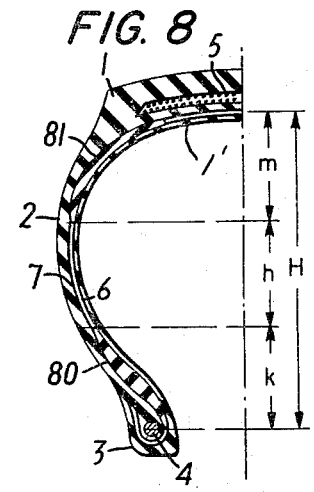
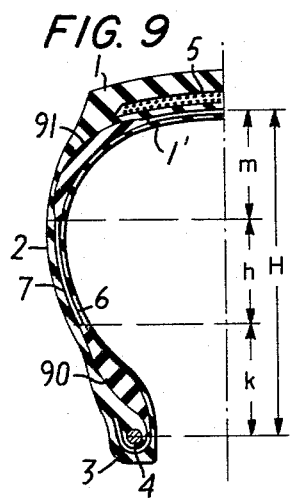
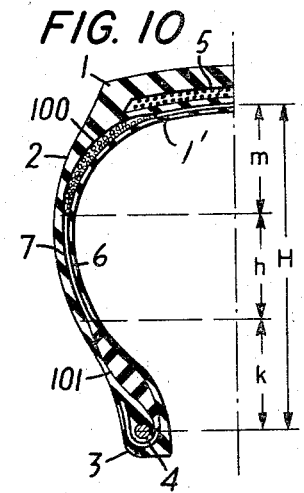
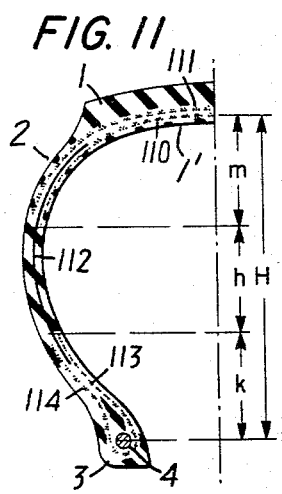
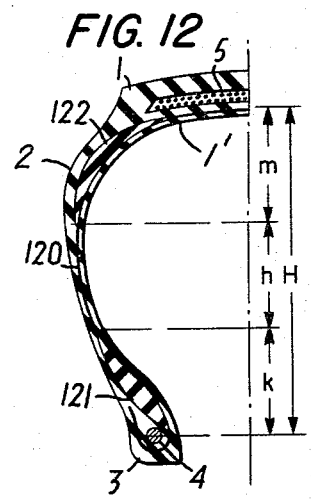
INVENTOR.
GEORGES LOUIS TRAVERS
BY Brumbaugh, Free, Graves
& Donohue
his ATTORNEYS

3,292,681
PNEUMATIC TIRES
Georges Louis Travers, Clermont-Ferrand, France, assignor to Compagnie Generale des Etablissements Michelin, raison sociale Michelin & Cie, Clermont-Ferrand, France
Filed Jan. 21, 1964, Ser. No. 339,276
Claims priority, application France, Feb. 1, 1963, 1,783; Nov. 7, 1963, 1,793
13 Claims. (Cl. 152—354)

This invention relates to pneumatic tires and, more particularly, to novel and improved sidewall structures for tire outer casings.

The sidewalls of tire casings have, among others, the following characteristics:

(a) Radial flexibility which permits the deflection of the tire under the action of vertical forces, especially under the load carried by the tire. It is generally an advantage that the radial deflection be great in order that the tire can adequately cushion impacts due to an uneven road surface;

(b) Lateral rigidity which counteracts the relative displacement of the tread with respect to the beads when the tread is clinging to the road and the vehicle is urged laterally with respect thereto. This relative displacement is caused by transverse forces set up during rolling, e.g. the horizontal component on a crowned road, centrifugal force in turns, side winds acting upon the vehicle body, etc. Lateral or transverse rigidity can be measured by the amount of displacement of the tread of a tire fitted on a wheel locked on a dynamometric plate which is then submitted to a lateral force of a given amplitude. It is often desirable that the lateral rigidity be great in order that the tire will behave satisfactorily under lateral forces, particularly to prevent under certain conditions, for instance, in a curve negotiated at high speed, the tire from being excessively deformed in the transverse direction. With presently known tires, such deformation can be large enough to cause a sidewall to contact the road surface. However, too great a lateral rigidity of the tire sidewalls is undesirable, because the tire does not sufficiently damp down the effects of lateral forces acting on the tread, such as those caused by unevenness of the road surface in a direction transverse to the direction of rolling;

(c) Longitudinal rigidity (also called circumferential rigidity) which enables the transmission, from the rim to the tread, of acceleration or deceleration torques when starting or braking, without any sliding of the tread on the ground and without over-stressing the elastomer of the sidewalls, especially on vehicles submitted to sudden starting or braking jerks.

The constructing of a tire casing having, simultaneously, the optimum degrees of radial flexibility and lateral and longitudinal rigidities is difficult, at best, and generally speaking, it has not been possible heretofore to improve one of these three characteristics without impairing at least one of the other two.

There is provided, in accordance with the invention, a tire casing having a sidewall structure possessing a radial flexibility at least as great as that of known tires and, moreover, higher lateral and longitudinal rigidities than those of known tires so that the tire can more closely meet the requirements of the rolling conditions for which it is designed. More particularly, a tire, according to the invention, comprises sidewalls having, with respect to the radial direction, a flexible mid-portion and a rigid portion on each side of the mid-portion, the flexible mid-portion having a suitable height and location within the sidewall. In terms of the height H of the sidewall measured parallel to the plane of symmetry of the tire, i.e. perpendicular to the axis of rotation of the wheel, the height $h$ of the flexible mid-portion should, according to the invention, be between $H/4$ and $H/2$, and preferably between $H/3$ and $H/2$. In practice the curvature of the tire carcass under the tread is negligible, so that the height H of the sidewall can be regarded as being equal to the height of the carcass.

It is the value of $h$ which, all other things being equal, determines the radial flexibility of the tire, because the rigid upper and lower sidewall portions do not significantly contribute to the elastic deformation of the sidewall under vertical forces, regardless of whether the vertical forces are permanent, such as that due to the load, or temporary.

It has, moreover, been found, contrary to expectation, that a tire, according to the invention, possesses a deflection, and consequently, a radial flexibility, as great as that of known tires, the sidewalls of which have a substantially uniform rigidity or flexibility between the edge of the tread and the level of the rim flange. In tires, according to the invention, the smaller height $h$ of the sidewall portion susceptible to flexure under vertical forces is compensated by a more stressed deformation of said portion. Thus, it is possible to control the radial flexibility of the tire without diminishing the necessary qualities of radial suppleness of the tire.

If $h$ is within the range $H/3$ to $H/2$, the radial flexibility is great, and substantially as great as that of tires noted for their radial suppleness. The degree of radial flexibility is lower if $h$ is included between $H/4$ and $H/3$, but it remains high enough for certain conditions of rolling which require other characteristics of the tire to be more greatly enhanced.

The location of the flexible mid-portion within the sidewall can be defined either by the height $k$ of the lower rigid portion or by the height $m$ of the upper rigid portion, since the total of the heights $k$, $h$ and $m$ is equal to the total height H of the sidewall. The lower rigid portion is the portion of the sidewall adjacent the bead and in contact with the rim flange, and the upper rigid portion is that portion of the sidewall adjacent to the tread.

In a tire, according to the invention, the dimension $k$ of the lower rigid portion should be between $h/2$ and $3/2h$, preferably between $2/3h$ and $h$. The dimension $m$ is then the difference between H and $h+k$. It is moreover, necessary that $k$ and $m$ be, in any case, not smaller than $H/6$.

Two tires, in accordance with the invention, having the same radial flexibility, i.e. a flexible mid-portion of the same height $h$, have different lateral and longitudinal rigidities if said mid-portion is located differently in the sidewall, i.e. if the respective dimensions $k$ and $m$ of the lower and upper rigid zones are not the same in the two tires. Further, it has been observed that the greater the dimension $m$ of the upper rigid portion, the more the lateral rigidity increases, the longitudinal rigidity being correspondingly lower.

In cases where no preference is to be given to any quality, the two rigid portions should have substantially equal heights ($k=m$). But if it is desired to increase the lateral rigidity to obtain a better behavior of the tire under lateral forces acting through the rim, while preserving the same radial flexibility, $k$ should have a relatively small value, closer to the minimum. This will be the case, more particularly, in passenger car tires designed for rolling and negotiating curves at high speed without their sidewall contacting the road. In effect, this means locating the flexible mid-portion relatively near the beads and giving the rigid portion above the mid-portion and adjacent the tread a relatively great height. A very rigid upper portion prevents any deformation of the sidewall in its portion located near the tread. Moreover, for a given displacement of the lower rigid portion, which is anchored in the rim by the bead when it is submitted to a lateral force, the sidewall in its entirety will tilt less towards the ground because the flexible portion is located relatively near the rim.

If, on the contrary, it is desired to give preponderance to the longitudinal rigidity to obtain a better behavior under circumferential forces, while still retaining the same radial flexibility, the dimension of the upper portion should be relatively great, say near its maximum value. This is equivalent to placing the flexible mid-portion relatively near the tread. In this case, since the flexible mid-portion with an unchanged height is nearer the tread, its total area is greater and more material takes part in resisting longitudinal forces.

If the above conditions for the location and the height of the flexible mid-portion of the sidewall are observed, a substantial radial flexibility is obtained without reducing the lateral rigidity or the longitudinal rigidity, and either of them can be made greater than the other according to the conditions of use intended for the tire. It is therefore possible, according to the invention, to manufacture tires with enhanced characteristics either for high speed, or for operation on surfaces with substantial lateral slopes or for vehicles having particularly great starting or braking torques.

Another feature of the invention is the provision of particularly advantageous and efficient means for ensuring a great flexibility of the sidewall at its mid-portion and a great rigidity in its upper and lower portions. More particularly, the desired radial flexibility of the mid-portion of the sidewall may be obtained by using, as a general means of reinforcing the sidewall, plies of threads, wires, cords, and the like running in radial planes, or a small number of cord plies in criss-cross arrangement, by reducing as much as possible the thickness of the sidewall in said mid-portion, and by using an appropriate rubber stock. Various combinations of these expedients can also, of course, be employed.

The rigidity of the upper and lower portions of the sidewall can be advantageously obtained, in accordance with the invention, by placing a layer of elastomeric material on either side of the mid-portion, the layer having a generally lenticular cross-section and a comparatively high hardness and modulus of elasticity, i.e. substantially higher than the hardness and modulus of elasticity of the elastomeric material used elsewhere in the sidewall. When the tire body is made up of superimposed plies of cords embedded in rubber, the lenticular layers of hard elastomeric material are preferably placed between two adjacent plies of cords. If there are more than two plies of cords, the elastomeric layed should preferably be placed between the two outermost plies. In the mid-portion, the superimposed cord plies should not be separated by anything but their thin calendered rubber coating or a thin layer of soft rubber, in order to reduce the thickness of the sidewall. Further, the sidewall should be made of an elastomeric material having a comparatively low modulus of elasticity.

It is, however, possible to build a pneumatic tire, in accordance with the invention, with a single ply of radial threads, wires, cords, etc., provided the upper and lower portions of the sidewalls are fitted with a lenticular layer of hard rubber stock, preferably located on the outside of the cord ply.

Other means of rigidifying the upper and lower portions of the sidewall can be used within the scope of the invention, the principal features being that each sidewall is comprised of three portions of which the middle one is flexible and the other two rigid, and that the middle portion has the height and location previously specified.

As to the lenticular layers of hard elastomeric material which, preferably according to the invention, are used to rigidify the upper and lower sidewall portions, the rigidity which these portions impart to the tire depends both on their average thickness and on the properties of the elastomeric material. Thus, the average thickness $e$ in millimeters) and the modulus of elasticity $M$ (in g./mm.$^2$) of the elastomeric material should be selected so that $eM \geqslant 50\sqrt{P}$, if the sidewall is reinforced with textile cords, or $eM \geqslant 30\sqrt{P}$ if with wires or metal cords, wherein P is the rated load in kilograms the tire is designed to carry.

The modulus of elasticity of an elastomeric material is defined by the equation $$M = \frac{F}{S} \times \frac{l_0}{1-l_0}$$

in which F is the stress to which a sample with a cross section S, an initial length $l_0$ and a final length $l$ between grips, is submitted.

As used herein, the modulus M corresponds to a constant factor $F/S$, equal to 200 grams per square millimeter, this value being fairly representative of the actual stress to which rubbery materials are submitted in tires. To measure M, it is sufficient to measure the relative elongation $$\frac{1-l_0}{l_0}$$

of the sample after a stress of 200 g./mm.$^2$ has been applied to it. This measure is carried out at a temperature of 20° C.±2°, after the same has been elongated three times, i.e. after physical accommodation, as follows: the stress is applied to the sample and, after the sample is in a state of balance, the stress is removed; after a resting period of a few seconds, the cycle is resumed, and reading takes place after the third elongation.

As stated before, it is also possible to manufacture a tire, in accordance with the invention, by reinforcing the upper and lower portions of its sidewalls by other means, particularly by means of additional plies of cords running radially or on the bias in said portions. More particularly, the rigidity of the upper portion of the sidewall can be obtained by extending the tread reinforcing plies, i.e. the plies located between the tread and the tire body, into the upper portion of each sidewall.

The difference in rigidity between the flexible mid-portion and the rigid upper and lower portions of the sidewalls can also be obtained by varying the angle of the cords of one or more of the tire body plies. The angle formed with a plane normal to a radial, cross-sectional plane will be between 70 and 90 degrees in the flexible mid-portion and between 20 and 45 degrees in the rigid upper and/or lower portions.

It is also possible to use any other means for securing a rigidity which varies in the three sidewall portions, provided the main feature of the invention, i.e. the division of the sidewall into a flexible mid-portion located between two rigid portions, the height and location of said mid-portion being as specified above, is observed.

As stated before, a tire casing, in accordance with the invention, can have any type of sidewall reinforcement known per se (radial or substantially radial cords; cords in crossed arrangement from one ply to another; cords running uninterrupted from one bead to the other or interrupted under the tread, etc.), and any type of tread and/or tread reinforcement, which would be used with conventional sidewalls, for instance a tread reinforcement comprised of plies of textile or metal cords at an angle, said plies extending across at least the entire width of the tread or only part of it, with or without a layer of high modulus elastomeric material.

For a more complete understanding of the invention, reference may be had to the following detailed description of an exemplary embodiment, taken in conjunction with the accompanying figures of the drawing, in which:

FIGS. 2–10 are half-sectional views taken on a radial plane of tire casings having two cord plies; and FIGS. 11 and 12 are half-sectional views taken on a radial plane of tire casings which comprise only one cord ply.

Figure 1:
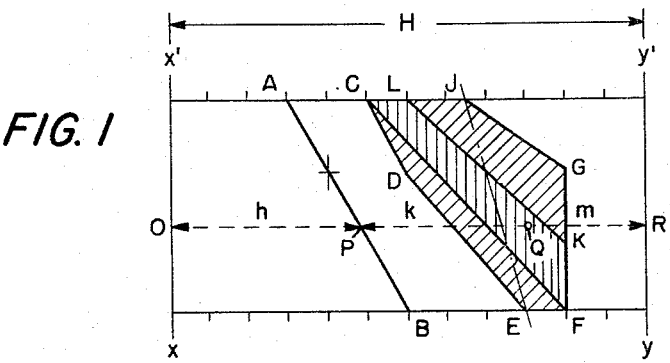
FIG. 1 is a graph of preferred ranges for the dimensions $h$, $k$ and $m$ of the three sidewall portions of pneumatic tires according to the invention.

In the diagram in FIG. 1 the distance between the two parallel axes $xx'$ and $yy'$ defines the total height H of the sidewall. The height $h$ of the flexible mid-portion is defined by the distance OP between the axis $xx'$ and a point P chosen on the segment of the straight line AB. Point A corresponds to the minimum value of $h$, point B to its maximum value; points located in-between represent intermediate values of $h$. The height $k$ of the lower rigid portion of the sidewall is defined by the distance PQ between point P on the segment AB and a point Q selected in the direction of OP within one of the two hatched zones, which are, respectively, bounded by the lines C D E F G J C and the lines C F K L C, the outer zone including all values which can be given to $k$ and the inner zone including preferred values for $k$. The height $m$ of the upper rigid portion is defined by the distance QR between point Q and the axis $yy'$.

It will be observed that it is thus possible to define a tire, in accordance with the invention, by means of a point Q in the hatched zones. To this end, a line perpendicular to $xx'$ and $yy'$ and through Q is drawn and the values for $h$, $k$ and $m$ are then represented by the distances OP, PQ and QR. The straight line J E (dash and dot line) across the hatched zones defines the points for which $k=m$. By varying the values for $h$, $k$ and $m$, an infinite number of desired combinations of radial flexibilities and lateral and longitudinal rigidities can be obtained.

Each of the tire casings of FIGS. 2–10 and 12 comprises a tread 1 overlying a tire body, which includes a crown portion 1' and two sidewalls 2 (only one being shown) extending from the edges of the crown portion, and beads 3 which contain bead reinforcement, such as a bead wire 4. A suitable type of tread reinforcement 5, for example crossed cord plies, extends along the inner portion of the tread $k$ above the tire body. The portions in the drawings hatched downwardly from left to right are parts of the tire covers therein which comprise natural or synthetic elastomeric stock having a modulus of elasticity of conventional values, whereas the parts hatched downwardly from right to left are layers of natural or synthetic elastomeric material with a somewhat greater modulus of elasticity, as will be described more fully hereinafter. Further, the tire body in each of the embodiments in the last mentioned figures includes two plies 6 and 7 of cords suitably orientated, such as in radial or substantially radial planes. These two plies may be separate plies (as shown in FIGS. 2 to 4 and 6 to 10) or a similar ply folded back around the bead wire (as in FIG. 5). As shown, they extend continuously from one bead portion 5 to the other and run under the tread reinforcement 5, but they may also be discontinuous in the sub-tread area, with or without overlapping of the ply ends.

Figure 2:
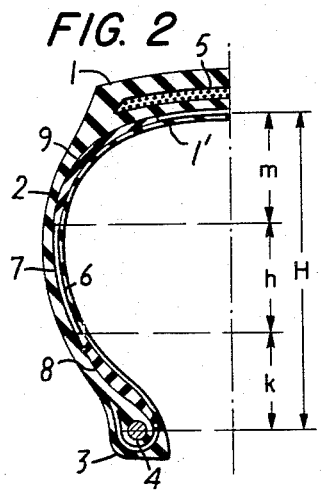

In the tire casing shown in FIG. 2, the heights $h$, $k$ and $m$ of each of the three portions which are, respectively, responsible for the radial flexibility, the longitudinal rigidity and the lateral rigidity, are substantially equal to $H/3$; this casing, therefore, is suitable for general use, that is, where emphasis need not be placed on the enhancement of any particular feature.

In order to provide radial flexibility in the tire, the two plies 6 and 7 of textile cables are, in the mid-portion $h$, very close together, no special rubber stock being inserted between them. But in the portions $k$ and $m$, the plies are more widely spaced apart and include between them inserts 8 and 9 of a natural or synthetic elastomeric material having a substantially lenticular cross-section with an average thickness of 3 mm. and a modulus of elasticity of 350 g./mm.$^2$ (100% elongation). The tire of FIG. 1 is designed for use on passenger cars and has a rated load capacity of about 500 kg.

Figure 3:
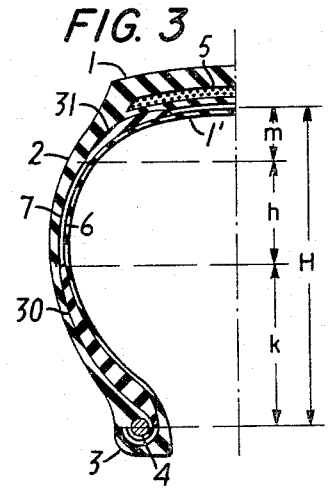

The tire casing shown in FIG. 3 differs from that in FIG. 2 in that the portion $k$ which contains a lenticular insert 30 is relatively high, say about $H/2$, thereby providing high longitudinal rigidity. But the radial flexibility of this casing is about the same as that in FIG. 2, since $h$ remains approximately $H/3$. The height of portion $m$ which contains a lenticular insert 31 is, therefore, about $H/6$, with a corresponding decrease in lateral rigidity, if the average thickness and modulus of the insert are the same as for the insert 8 in FIG. 2. This tire casing is well suited for use on construction and other heavy-duty vehicles.

Figure 4:
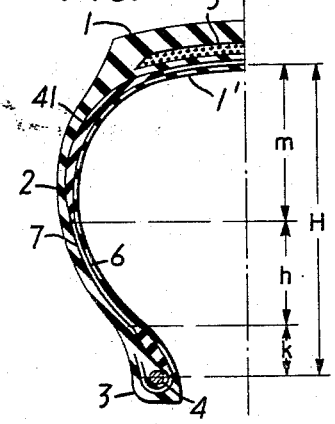

Referring to FIG. 4, the embodiment shown therein has substantially the same radial flexibility as the tires of FIGS. 2 and 3, inasmuch as $h$ is still approximately $H/3$. But the portion $m$ and its insert 41, which has a height of about $H/2$, enhance the behavior of the tire under lateral forces, such as centrifugal force or side wind. It is therefore particularly adapted for vehicles traversing curves at high speeds and for which a longitudinal rigidity is of lesser importance.

Figure 5:
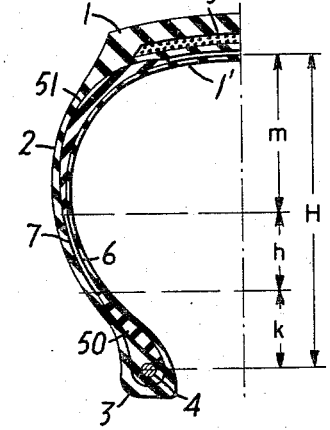

As compared with the tire casing shown in FIG. 4, the casing illustrated in FIG. 5 has two rigid portions $h$ and $k$ of equal heights of about $H/4$. The radial flexibility of this cover is therefore somewhat lower, but assuming for a lenticular insert 50 in portion $k$ the same thickness and modulus as in the example of FIG. 2, its longitudinal rigidity is greater than that of the casing in FIG. 4. In the tire in FIG. 5, the tire body plies 6 and 7 consist of radial metallic cables between which there is inserted in the portion $k$ the lenticular layer 50 and, in the portion $m$, a lenticular layer 51; these two layers have an average width of 3 mm. and a modulus of elasticity of 280 g./mm.$^2$, and the tires are designed for passenger cars with a design load of about 500 kg.

In FIG. 6, the three portions $m$, $h$ and $k$ have, respectively, heights of $3H/8$, $H/4$ and $3H/8$. This casing is thus comparable to that shown in FIG. 5 as to radial flexibility. Its two rigid portions $k$ and $m$ give it good longitudinal and lateral rigidities, and render it particularly suitable for vehicles which carry heavy loads at high speed. The two plies 6 and 7 consist of metallic cables. A lenticular layer 60 included between these two plies in the portion $k$ has an average thickness of 3 mm. and a modulus of 300 g./mm.$^2$, and in the portion $m$ a lenticular layer 61 has an average thickness of 4 mm. and a modulus of 400 g./mm.$^2$. The tire is designed to carry a load of about 1,500 kg.

For a pneumatic tire which should be very flexible radially while having a high longitudinal rigidity and a moderate lateral rigidity, the relative dimensions shown in FIG. 7 are preferred, the heights of portions $m$, $h$ and $k$ being, respectively, about $H/4$, $3H/8$ and $3H/8$, the portions $m$ and $k$ having layers 70 and 71 of high modulus elastomeric material between the cords 6 and 7. This tire is designed for construction equipment, trucks and the like.

FIGURES 8 and 9 illustrate two embodiments of tires for passenger cars, with a nominal design load of about 500 kg. for each. The heights of their portions $m$, $h$ and $k$ are substantially equal, i.e., about $H/3$. Although lenticular layers 80 and 81 in FIG. 8 are thinner than corresponding layers 90 and 91 in FIG. 9 (1.5 mm. as compared to 4 mm.), the factor $eM$ is substantially the same in each, the layers 80 and 81 having a modulus higher than that of layers 90 and 91, in the ratio of 4/1.5, to obtain the same overall rigidity. In these embodiments, the modulus of layers 80 and 81 is equal to 700, that of layers 90 and 91 to 260. The plies 6 and 7 are metallic cables and extend in radial planes.

The tire casing shown in FIG. 10 illustrates one possible means of rigidifying one of the portions $m$ or $k$ other than by providing a layer of an elastomeric material with a high modulus. In this embodiment, the rigid portion $m$ is rigidified by metallic cables 100 crossing radial textile cables 6 and 7 of the tire body at angles, preferably between about 45° and about 70°. The portion $k$ has a layer 101 of high modulus elastomeric material, but it might also use crossed plies of cords.

FIG. 11 shows another form of reinforcement for rigidifying the portion $m$ in which tread reinforcing cords are utilized. Two plies 110 and 111 of crossed metallic cables under the tread extend through the portion $m$ and build in the latter with the radial cable ply 112 a rigid triangulated reinforcement. In portion $h$ which must be very flexible radially, only the ply 112 of radial cables is present. In portion $k$ ends 113 and 114 of a single ply of metallic cables installed on the bias are folded around the bead wire 4 and give this portion of the sidewall high longitudinal rigidity.

In the embodiment shown in FIG. 12, the tire body comprises only one ply 120 of metallic cables. The portions $m$ and $k$ are rigidified by lenticular layers 121 and 122 located on the external side of the ply 120. In this example, the average thickness of these layers is 3 mm., the modulus 500, the tire casing being capable of carrying a load of about 2,500 kg.

In the various embodiments described above no mention has been made of the usual reinforcements in the bead portions of pneumatic tires, such as flippers or apex rubber strips, but it should be understood that various bead reinforcements can be used in a tire, in accordance with invention, some of which may contribute to an increase in the rigidity of the portion $k$. Also, there might be, as known per se, more than one bead wire in each bead.

Thus, there is provided, in accordance with the invention, a novel and improved tire having a sidewall structure which can be adapted to fulfill various specific requirements in use and, in general, possesses high vertical flexibility, thereby ensuring a comfortable ride and preventing high fatigue of the vehicle suspension, improved cornering at high speed without contact of the sidewall with the road, improved stability at very high speed, better performance when running in under-inflated conditions by preventing pinching of the sidewall against the rim or against the tread, and reduced tread wear.

It will be understood by those skilled in the art that the described embodiments are meant to be merely exemplary and that they are susceptible of many variations and modifications without departing from the spirit and scope of the invention. Therefore, the invention is not deemed to be limited except as defined in the appended claims.

I claim:

1. A pneumatic tire casing comprising a tire body having spaced-apart sidewalls and a crown portion between said sidewalls and consisting of an elastomeric material having reinforcing means embedded therein, a tread overlying said crown portion, and beads at the inner ends of said sidewalls, said sidewalls consisting of a first portion adjacent said bead, a second portion adjacent said first portion, and a third portion between said second portion and said crown portion, said first portion and third portion having additional reinforcing means therein, said additional reinforcing means and body reinforcing means being in direct mutual contact with each other and constituting a unitary reinforcement structure rendering said first and third portions substantially more rigid than said second portion.

2. A tire casing as claimed in claim 1 wherein said tire body reinforcing means consists of plies of generally radially extending cords, and said additional reinforcing means in at least one of said first and third portions comprises at least two crossed plies of reinforcing cords which are arranged at angles of between about 45° and about 70° with the cords of said tire body.

3. A tire casing as claimed in claim 1 wherein said additional reinforcing means in at least one of said first and third portions comprises a layer of elastomeric material having a substantially greater modulus of elasticity than the elastomeric material of said tire body.

4. A tire casing as claimed in claim 1 wherein said body reinforcing means includes at least one cord ply in each sidewall and wherein said additional reinforcing means includes a layer of an elastomeric material having a modulus of elasticity of at least 280 g./mm.$^2$ at 100% elongation.

5. A tire casing as claimed in claim 1 wherein said additional reinforcing means includes at least one ply of cords.

6. A tire casing as claimed in claim 1, wherein the dimension of each of said first and second rigid portions taken along a straight line normal to the axis of the casing and in a radial plane is at least one-sixth of the dimension of said sidewall taken along said line.

7. A tire casing as claimed in claim 1, wherein the dimension of said flexible portion taken along a straight line normal to the axis of the casing and in a radial plane is between about one-quarter of and about one-half of the dimension of said sidewall taken along said line.

8. A tire casing as claimed in claim 7, wherein the dimension taken along said line of said first rigid portion is between about two-thirds of and one and one-half times the dimension of said flexible portion taken along said line.

9. A pneumatic tire casing, comprising a tire body having spaced-apart sidewalls and a crown portion between said sidewalls and consisting of an elastomeric material having closely spaced reinforcing plies embedded therein, a tread overlying said crown, and beads at the inner ends of said sidewalls, each of said sidewalls consisting of a first portion adjacent the bead, a second portion adjacent said first portion and a third portion extending between said second portion and said crown portion, said reinforcing plies spaced substantially farther apart in said first and third portions than in said second portion, and said first and third portions each having a layer of elastomeric material embedded between and in direct contact with said spaced-apart reinforcing plies, the material of said layer having a substantially greater modulus of elasticity than the material of said tire body and coacting with said body reinforcing plies to render said first and third portions substantially more rigid than said second portion.

10. A pneumatic tire casing comprising a tire body having spaced-apart sidewalls and a crown portion between said sidewalls and consisting of an elastomeric material having closely spaced reinforcing plies embedded therein, said reinforcing plies consisting of metallic cords, a tread overlying said crown portion, beads at the inner ends of said sidewalls, each of said sidewalls consisting of a first portion adjacent the bead, a second portion adjacent said first portion and a third portion extending between the second portion and said crown portion, said reinforcing plies being spaced substantially farther apart in said first and third portions than in said second portion, and said first and third portions each having a layer of elastomeric material embedded between said spaced-apart reinforcing plies, the material of said layer having a substantially greater modulus of elasticity of material than that of the material of said tire body, and the average thickness $e$ in millimeters and the modulus of elasticity M in grams per square millimeter of said layer of elastomeric material are such that the product of $e$ and M is equal to or greater than thirty times the square root of P, in which P is the design load of the tire in kilograms of the tire casing.

11. A pneumatic tire casing comprising a tire body having spaced-apart sidewalls and a crown portion between said sidewalls and consisting of an elastomeric material having closely spaced reinforcing plies embedded therein, the reinforcing plies consisting of textile cords, a tread overlying said crown portion, and beads at the inner ends of said sidewalls, each of said sidewalls consisting of a first portion adjacent the bead, a second portion adjacent said first portion, and a third portion extending between said second portion and said crown portion, said reinforcing plies being spaced substantially farther apart in said first and third portions than in said second portions, said first and third portions, each having a layer of elastomeric material embedded between said spaced-apart reinforcing plies, the material of said layer having a substantially greater modulus of elasticity than that of the material of said tire body, and the average thickness $e$ in millimeters and the modulus of elasticity $M$ in grams per square millimeter of said layer of elastomeric material are such that the product of $e$ and $M$ is equal to or greater than fifty times the square root of P, in which P is the design load in kilograms of the tire casing.

12. A pneumatic tire casing comprising a tire body having spaced-apart sidewalls and a crown portion between said sidewalls and consisting of an elastomeric material having reinforcing means embedded therein, said reinforcing means including substantially parallel reinforcing cords extending from the bead to the crown portion of the tire, a tread overlying said crown portion, and beads at the inner ends of said sidewalls, said sidewalls consisting of a first portion adjacent said bead, a second portion adjacent said first portion, and a third portion between said second portion and said crown portion, said first portion and third portion having additional reinforcing means therein disposed in direct contact with and joined to said sidewall reinforcing cords and coacting with said sidewall reinforcing cords to provide substantially greater rigidity in said first and third portions than in said second portion.

13. A tire casing as claimed in claim 12 wherein said body reinforcing means includes at least two cord plies in each sidewall and wherein said additional reinforcing means includes a layer of an elastomeric material having a modulus of elasticity of at least 280 g./mm.$^2$ at 100% elongation, said body reinforcing cord ply being spaced-apart in said first and third portions of said sidewall and said layer of elastomeric material being located between and in direct contact with said cord plies.

References Cited by the Examiner

UNITED STATES PATENTS

| 1,530,574 | 3/1925 | Paull | 152—360 |
| 3,052,275 | 9/1962 | Hylberg | 152—354 |
| 3,062,259 | 11/1962 | Boussu et al. | 152—356 |
| 3,095,027 | 6/1963 | Weber | 152—354 |

FOREIGN PATENTS

| 598,804 | 6/1934 | Germany. |
| 1,231,111 | 4/1960 | France. |

ARTHUR L. LA POINT, *Primary Examiner.*

C. W. HAEFELE, *Assistant Examiner.*